Jan. 14, 1930.   J. P. HALSTEAD ET AL   1,743,342
PERCOLATOR
Filed Nov. 28, 1928
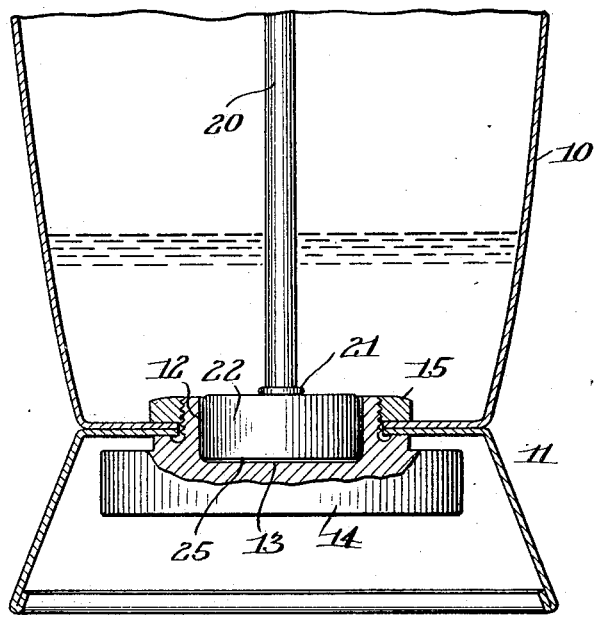
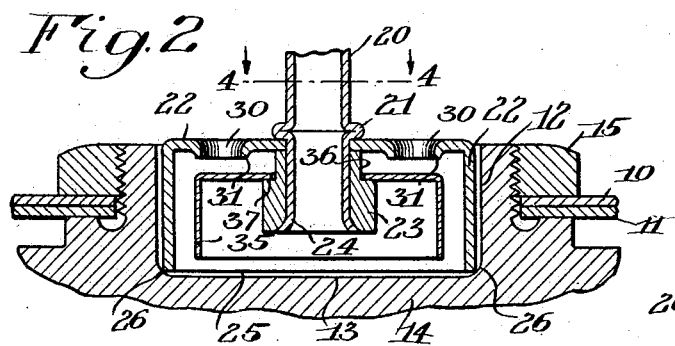
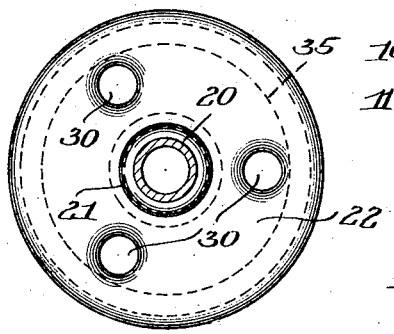
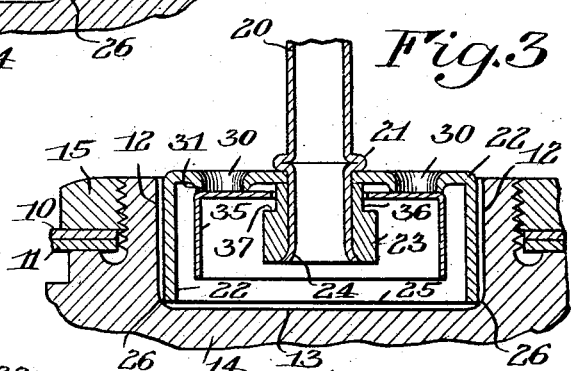
INVENTORS
John P. Halstead
Hermann M. A. Strauss
By Crumpton & Griffith
Their ATTORNEYS Patented Jan. 14, 1930

1,743,342

UNITED STATES PATENT OFFICE

JOHN P. HALSTEAD AND HERMANN M. ALFRED STRAUSS, OF ROCHESTER, NEW YORK, ASSIGNORS TO ROBESON-ROCHESTER CORPORATION, OF ROCHESTER, NEW YORK, A CORPORATION OF NEW YORK

PERCOLATOR

Application filed November 28, 1928. Serial No. 322,385.

This invention relates to a percolator and has for its principal object the provision of a more simple, convenient, and generally improved valve structure which will enable the percolator to operate more satisfactorily and with greater efficiency than the previous constructions used.

Another object is the provision in a percolator of a heating mechanism including a valve device which is simple and self contained in structure, inexpensive to manufacture and assemble, and which is adapted to operate in an efficient and reliable manner without clogging by coffee grounds or other solid matter.

To these and other ends the invention resides in certain improvements and combinations of parts, all as will be hereinafter more fully described, the novel features being pointed out in the claims at the end of the specification.

In the drawings:

Fig. 1 is a vertical section taken centrally through the lower part of a percolator constructed in accordance with a preferred embodiment of the present invention;

Fig. 2 is an enlarged vertical section taken centrally through the valve structure, showing the valve in open position;

Fig. 3 is a similar view showing the valve in closed position, and

Fig. 4 is a section through the percolator fountain tube on the line 4—4 of Fig. 2, showing parts of the valve structure in plan.

Similar reference numerals throughout the several views indicate the same parts.

There is illustrated in Fig. 1 the lower part of the liquid chamber 10 of a percolator which rests upon a suitable base 11. The percolator is provided with a heating chamber in which liquid may be heated by any suitable means, this heating chamber having side walls 12 preferably of cylindrical form and a bottom 13. In the present instance, the side walls and bottom are formed as part of a heating unit 14 which may have electrical heating coils imbedded therein. It is obvious that if it were desired to heat the percolator by a stove instead of by electrical means, the base 11 could simply be made of less height so that the heating unit 14 would rest upon the top of a stove. A nut 15 cooperating with a threaded portion of the heating unit may be used to clamp the body 10 to the base 11.

Extending upwardly from the heating chamber is a percolator fountain tube 20 which may carry at its upper end the usual coffee basket in which ground coffee is placed and over which the hot water rising through the fountain tube is sprayed. Near its lower end the fountain tube is provided with a crimped shoulder 21 which contacts with one side of a cup-shaped member 22 placed in inverted position on the tube. On the other side of this cup-shaped member is a collar 23 retained on the end of the tube by having the tube flared or spun outwardly as at 24.

This inverted cup-shaped member 22 has substantially cylindrical side walls of slightly less diameter than the diameter of the heating chamber, so that these side walls will fit within the side walls 12 of the chamber as shown in Figs. 2 and 3. The lower edge 25 of the member is arranged to rest upon the curved or arcuate portions 26 formed at the junction of the side walls 12 and bottom 13 of the heating chamber. Thus a good contact is secured between the bottom of the member 22 and the sides of the heating chamber, so that leakage or by-passing of liquid or steam is negligible.

The inverted cup-shaped member 22 has one or more ports 30 in its top, three of these being illustrated in Fig. 4, arranged symmetrically about the fountain tube. Each port is formed with a boss 31 around it which extends a slight distance inwardly from the top of the cup-shaped member, as shown clearly in Figs. 2 and 3.

A valve member 35, also of an inverted cup shape, is mounted for movement within the member 22 to open and close the ports 30. Preferably this valve member 35 is arranged loosely on a reduced portion 36 of the collar 23, so that it is free to move axially up and down this reduced portion, and is retained thereon by the larger portion of the collar. When the valve is in its lower or open position, shown in Fig. 2, the top thereof contacts with the shoulder 37 at the bottom of the reduced portion 36, and this acts to seal the small opening which must be left between the valve member and the reduced portion 36 to allow sufficient play or clearance so that the valve member may move readily.

In operation, liquid within the chamber 10 of the percolator flows down through the port 30 into the heating chamber, where it is heated to the boiling point. Steam forming therein gradually accumulates under the cup-shaped valve member 35 from which it can not readily escape, until sufficient steam pressure is formed to lift the valve from the position shown in Fig. 2 to that illustrated in Fig. 3. In this latter position, the top of the valve member 35 comes into contact with the bosses 31 surrounding the ports 30, and effectively closes these ports. When the supply of colder water is thus cut off, the liquid within the heating chamber heats still more rapidly and an upward rush of boiling liquid and steam through the fountain tube 20 results. When a considerable part of the fluid within the heating chamber has been forced up the fountain tube, the pressure within the chamber falls below that within the main body of the container 10, so that the valve falls to the position shown in Fig. 2 and thus opens the ports 30. A fresh supply of liquid then enters the heating chamber. This liquid is heated in turn until the steam closes the valve, and then is forced up the fountain tube as before.

The shoulder 37 which seals the play or clearance opening of the valve member is of considerable importance, in the efficient functioning of the device, as it prevents the escape of the steam and thus enables the necessary amount of steam to be accumulated within the valve member more rapidly than would be the case if a part of it were allowed to escape between the valve and the collar.

It will be noted from Figs. 2 and 4 that the valve member 35 does not fit closely within the inverted cup-shaped member 22, but that there is a considerable annular space between these two members. This space is intentionally made of sufficient size so that coffee grounds and similar solid matter which might be present in the percolator will not stick or become lodged therein, but is able to pass freely therethrough. The valve member is of sufficient size, however, so that it overlies the major portion of the area of the bottom of the heating chamber, and thus the major portion of the steam formed in the heating chamber may pass directly upwardly into the valve member. The ports 30 are made comparatively large so that coffee grounds will not stick in them.

While one embodiment of the invention has been disclosed, it is to be understood that the inventive idea may be carried out in a number of ways. This application is therefore not to be limited to the precise details shown, but is intended to cover all variations and modifications thereof falling within the spirit of the invention or the scope of the appended claims.

We claim as our invention:

1. In a percolator, the combination with a heating chamber, of a fountain tube extending upwardly therefrom, a cup shaped member mounted on said fountain tube in inverted position and positioned partially within said heating chamber, said cup shaped member having a port therein, and an inverted cup shaped valve member mounted for movement within said cup shaped member to open and close said port, there being a free space of substantial size between the sides of said valve member and those of said cup shaped member to provide free passageway for coffee grounds without clogging.

2. In a percolator, the combination with a heating chamber, of a fountain tube extending upwardly therefrom, an inverted cup shaped member mounted on said fountain tube and positioned partially within said heating chamber, said cup shaped member having a port therein, a retaining member mounted on said tube for holding said cup shaped member in place thereon, said fountain tube being expanded to hold said retaining member in place, and a valve member of inverted cup shape movably mounted on said retaining member to open and close said port.

3. In a percolator, the combination with a heating chamber, of an inverted cup shaped member positioned partially within said heating chamber, a fountain tube extending upwardly from said cup shaped member substantially at the center thereof, said cup shaped member having a plurality of ports around said fountain tube and an inwardly extending boss surrounding each port, a collar on said fountain tube for retaining said tube and said cup shaped member in cooperative relationship, said tube being expanded to hold said collar in place, and an inverted cup shaped valve member movably mounted on said collar to shift into and out of contact with said bosses to open and close said ports.

4. In a percolator, the combination with a heating chamber, of an inverted cup shaped member positioned partially within said chamber, said member having a port therein, a fountain tube extending through said member, a collar on the lower end of said fountain tube for retaining said tube in cooperative relationship with said member, said tube being expanded to hold said collar in place, said collar having a portion of reduced diameter and another portion of larger diameter, and an inverted cup shaped valve member mounted for movement within said cup shaped member to open and close the port thereof, said valve member being mounted upon the reduced portion of said collar.

5. In a percolator, the combination with a heating chamber having substantially cylindrical side walls and arcuate portions near the bottoms of said side walls, of a fountain tube extending upwardly from said heating chamber, an inverted cup shaped member mounted on said fountain tube, said member having substantially cylindrical walls of slightly less diameter than the diameter of said heating chamber, said walls extending down into said heating chamber so that the bottom edges thereof rest upon said arcuate portions, said member having a port therein, and a valve member mounted for movement within said inverted cup shaped member to open and close said port.

6. In a percolator, the combination with a member having a well-like heating chamber, of a fountain tube extending upwardly from said heating chamber, an inverted cup shaped member mounted on said fountain tube and arranged to fit within said heating chamber and to cover substantially the entire area of the bottom thereof, said member having a port, and an inverted cup shaped valve member mounted for movement within said cup shaped member to open and close said port.

7. In a percolator, the combination with a heating chamber, of a fountain tube extending upwardly therefrom, an inverted cup shaped member mounted on said fountain tube, said cup shaped member having a port therein, and an inverted cup shaped valve member mounted for movement within said cup shaped member to open and close said port, said valve member being of a size to cover the major portion of the area of the bottom of said heating chamber so that the major portion of steam formed in said heating chamber will pass directly into said cup shaped valve member.

JOHN P. HALSTEAD.
HERMANN M. ALFRED STRAUSS.